(No Model.)
G. COFFMAN.
HARROW.
No. 379,003. Patented Mar. 6, 1888.
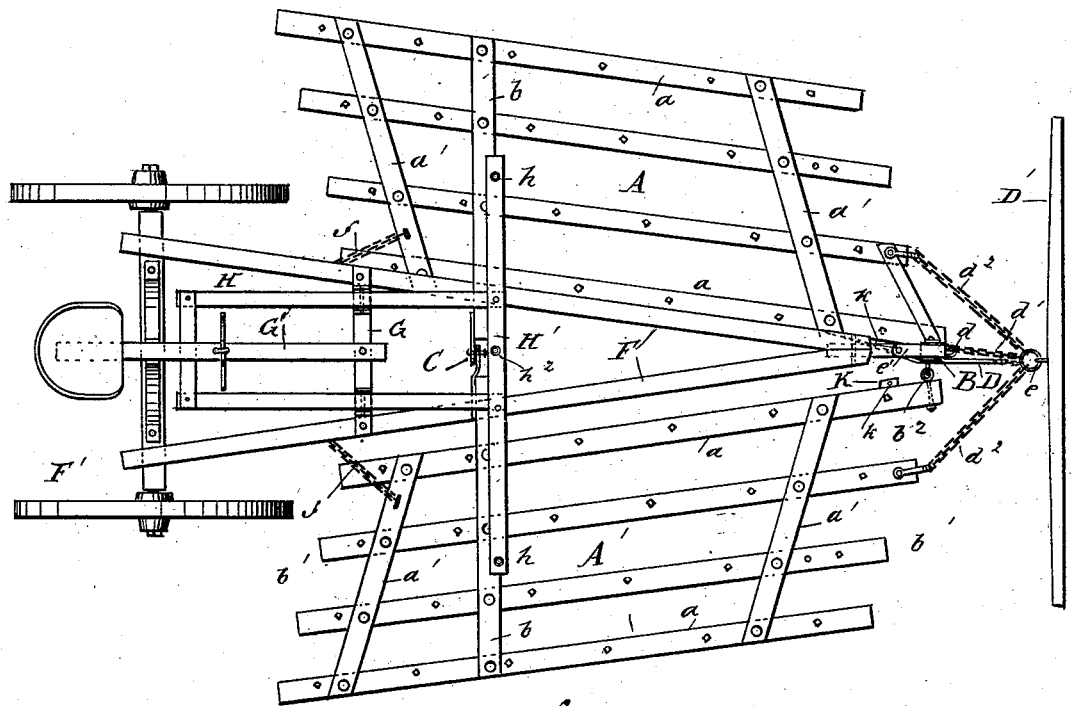
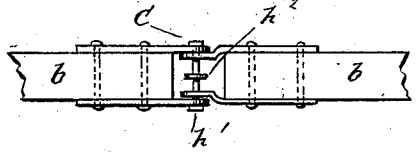
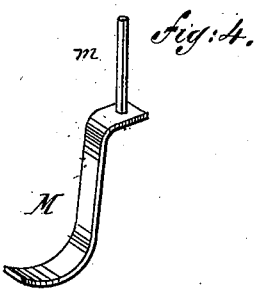
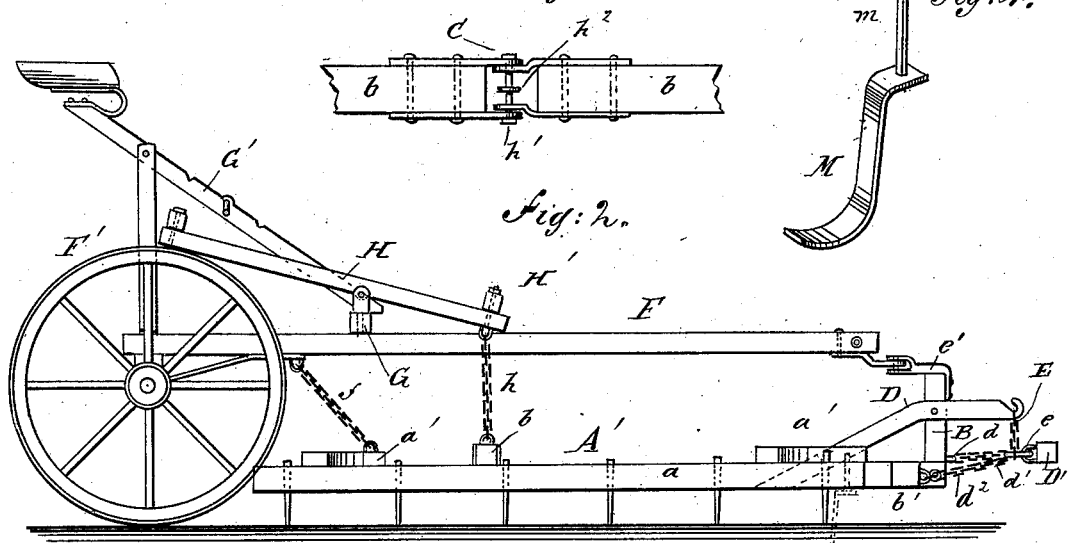
WITNESSES: INVENTOR:
G. Coffman
BY Munn & Co.
ATTORNEYS.

UNITED STATES PATENT OFFICE.

GEORGE COFFMAN, OF SPEARVILLE, KANSAS, ASSIGNOR TO HIMSELF, PHILIP J. UPP, AND WILLIAM A. REID, ALL OF SAME PLACE.

HARROW.

SPECIFICATION forming part of Letters Patent No. 379,003, dated March 6, 1888.

Application filed September 22, 1887. Serial No. 250,419. (No model.)

*To all whom it may concern:*

Be it known that I, GEORGE COFFMAN, of Spearville, in the county of Ford and State of Kansas, have invented a new and Improved Harrow, of which the following is a full, clear, and exact description.

My invention relates to an improvement in harrows, and has for its object to provide a harrow which may be taken to the field entire, and which may be utilized to carry a plow or sacks of grain to the field, and wherein the harrow will be of light draft, adjustable to unevenness of surface, and also may be lifted entirely from the surface when found desirable.

The invention consists in the construction and combination of the several parts, as will be hereinafter fully set forth, and pointed out in the claims.

Reference is to be had to the accompanying drawings, forming a part of this specification, in which similar letters of reference indicate corresponding parts in all the figures.

Figure 1 is a plan view of the harrow, and Fig. 2 is a side elevation. Figs. 3 and 4 are detail views.

In carrying out the invention the body of the harrow is made in two sections, A and A', each section consisting of a series of parallel bars, $a$, held a given distance apart by inclined transverse end braces, $a'$, and an intervening straight transverse bar, $b$. The said braces and bar are secured to each tooth-carrying bar $a$, which latter are so positioned as that the ends are stepped, as shown at $b'$ in the drawings.

To the inner forward end of the section A a vertical beam, B, is attached, and to said beam the forward inner end of the section A' is hinged, as shown at $b^2$, Fig. 1. The rear inner ends of the harrows are held a distance apart by the hinged connection C of the contiguous projecting ends of transverse bars $b$, whereby the two sections are held to work in unison, and a more or less V-shaped space is made to intervene the contiguous sides of the harrow, as shown in Fig. 1.

To the inner toothed bar of the section A a plate, D, is attached, which plate is projected upward and outward beyond the front of the harrow, being secured by bolts or otherwise to the vertical or perpendicular beam B.

To an eye, $d$, in the beam B a length of chain, $d'$, is attached, terminating in a ring, $e$, to which the doubletree D' is secured, the draft being rendered equal upon both sections by the attachment of chain $d^2$ to the same tooth-carrying bar of each harrow at the forward end and to said ring.

The doubletree is prevented from dragging upon the ground and the traces from interfering with the feet of the team when the implement is stopped by connecting the end of the plate D with the ring $e$ by a length of chain, E, whereby the doubletree may be raised or lowered, as desired.

To the upper end of the vertical beam B a rearwardly-extending plate, $e'$, is attached, having a bifurcated end, in which plate the reduced and forward end of a V-shaped reach-bar, F, is pivoted, as shown in Fig. 2.

The reach-bar F is projected rearward above the united harrow beyond the same to an engagement at the enlarged end with a two-wheel truck, F', and the said reach-bar is united with each harrow at the back by a chain or other flexible connection, $f$.

Near the rear of the reach-bar a transverse beam, G, is secured upon the upper face, from the center of which beam the seat-bar G' is upwardly and rearwardly projected, supported at the upper end by brace-rods secured to the axle of the truck and likewise to the seat-bar at or near the seat.

At each side of the seat-bar G' upon the beam G the members of a substantially U-shaped lever, H, are fulcrumed, the said lever being extended rearward sufficiently to bring the end within easy reach of the driver's feet.

Transversely the forward end of the lever H a lifting-bar, H', is secured, adapted to extend outward upon each side parallel with the hinged connecting-bars $b$, and the said hinged bars and the ends of the lifting-bars are united by a link or chain connection, $h$, and the center of the lifting-bar and the pivotal pin $h'$, completing the hinged connection of the bars $b$, are also united by a similar link or chain connection, $h^2$.

Upon the inner face of each section A and A', near the forward end, brackets K are secured, the bracket on one section aligning the bracket on the other, and in said brackets auxiliary teeth $k$ are detachably held.

In harrowing or cultivating small corn the teeth $k$ are removed to permit the free passage of the corn through the V-space intervening the harrows.

In operation by simply manipulating the lever H the driver may raise and lower the harrow at pleasure and without inconvenience to make a turn or prevent the teeth sinking too deep in the ground.

When the harrow is to be driven to or from the field, one or more shoes, M, are inserted in the under side of the teeth-bars between the teeth, which shoes constitute runners for the forward ends of the harrows. As illustrated in Fig. 4, the shoes M are substantially S-shaped and provided at one end with a shank or stud, $m$, adapted to enter a suitable aperture in the harrow-sections.

Having thus described my invention, what I claim as new, and desire to secure by Letters Patent, is—

1. The combination, with the harrow-sections hinged to one another and provided with an inclined draft-adjusting plate, the draft-connections, and the lift-chain, of a truck, a V-shaped reach-bar projected from said truck over the harrows, a flexible connection between the reach-bar and harrows, a foot-lever pivoted upon said reach, a lifting-bar secured to said lever, and a flexible connection between the lifting-bar and harrows, substantially as set forth.

2. The combination, with the harrow-sections A and A', hinged to one another and having their ends stepped in opposite directions and provided with auxiliary detachable teeth $k$, an inclined draft-adjusting plate, D, the draft-connections $d'$ and $d^2$, and the lift-chain E, of a truck, F', a V-shaped reach-bar, F, projected from said truck over the harrows, a flexible connection between the reach-bar and harrows, a foot-lever pivoted upon said reach, a lifting-bar secured to said lever, a flexible connection between the lifting-bar and harrows, and S-shaped detachable shoes or runners attached to the under side of the harrows at the front, substantially as shown and described, and for the purpose herein set forth.

GEORGE COFFMAN.

Witnesses:
HENRY C. BAIRD,
CYRUS COLVILLE.